(12) United States Patent
Drohula et al.

(10) Patent No.: US 7,435,344 B2
(45) Date of Patent: Oct. 14, 2008

(54) DEVICE FOR SEPARATING IMPURITIES FROM LIQUIDS

(75) Inventors: Knud Drohula, Hamburg (DE); Carsten Behnke, Hamburg (DE); Frank Fischer, Schenefeld (DE)

(73) Assignee: B + V Industrietechnik GmbH, Hamburg (DE)

( * ) Notice: Subject to any disclaimer, the term of this patent is extended or adjusted under 35 U.S.C. 154(b) by 290 days.

(21) Appl. No.: 11/217,221

(22) Filed: Sep. 1, 2005

(65) Prior Publication Data
US 2006/0049095 A1 Mar. 9, 2006

(30) Foreign Application Priority Data
Sep. 3, 2004 (DE) .................... 10 2004 042 726

(51) Int. Cl.
*B01D 29/58* (2006.01)
(52) U.S. Cl. .............. 210/232; 210/237; 210/238; 210/323.2; 210/450; 210/477
(58) Field of Classification Search ............ 210/232, 210/237, 238, 323.2, 450, 477, DIG. 5
See application file for complete search history.

(56) References Cited

U.S. PATENT DOCUMENTS

| 2,766,890 | A | * | 10/1956 | Walter | 210/317 |
|---|---|---|---|---|---|
| 2,864,505 | A | * | 12/1958 | Walter | 210/315 |
| 2,872,043 | A | * | 2/1959 | Fitzgerald et al. | 210/307 |
| 3,085,690 | A | * | 4/1963 | May | 210/307 |
| 3,738,492 | A | * | 6/1973 | Trillich | 210/196 |
| 4,059,511 | A | * | 11/1977 | Musha et al. | 210/708 |
| 4,151,087 | A | * | 4/1979 | Sakaguchi | 210/109 |
| 4,871,455 | A | * | 10/1989 | Terhune et al. | 210/232 |
| 5,443,724 | A | * | 8/1995 | Williamson et al. | 210/323.2 |
| 6,692,639 | B1 | * | 2/2004 | Spearman et al. | 210/323.2 |

FOREIGN PATENT DOCUMENTS

| WO | 94/05396 | 3/1994 |
|---|---|---|
| WO | 97/38781 | 10/1997 |

* cited by examiner

*Primary Examiner*—Thomas M Lithgow
(74) *Attorney, Agent, or Firm*—Friedrich Kueffner

(57) ABSTRACT

A device for separating impurities from liquids has at least one separating container for separating impurities from a liquid/impurities mixture flowing in a flow direction through the at least one separating container. A partition divides the interior of the at least one separating container. At least two separating elements are arranged sequentially in the flow direction within the separating container, wherein the at least two separating elements have different diameters parallel to the partition.

7 Claims, 2 Drawing Sheets

DEVICE FOR SEPARATING IMPURITIES FROM LIQUIDS

BACKGROUND OF THE INVENTION

1. Field of the Invention

The invention relates to a device for separating impurities from liquids. The device comprises at least one separating container for separating the impurities from the mixture of impurities and liquid. The interior of the separating container is divided by at least one partition and at least two separating elements connected to one another are arranged sequentially in the flow direction within the separating container.

2. Description of the Related Art

Such devices serve for separating liquids or solids from a carrier liquid. In particular, it is possible to perform separation of oil and water and to separate in this way oil-like contaminants from water.

Typically, so-called oil separators are of a two-stage configuration. Separation of the oil is realized by using the effect of gravity based on different densities of the substances to be separated from one another as well as by using separating elements that assist in combining small and smallest contaminant particles to larger particles that can be more easily removed than very small particles. In particular, the separating elements serve for combining finely dispersed emulsified oil droplets to larger oil droplets that will rise within water. Moreover, the separating elements act like filters and retain finely dispersed solids that do not easily settle based on the effect of gravity.

According to the prior art, two separating elements are usually arranged sequentially in the flow direction and are connected in the flow direction by tie rods. When mounting and demounting the filter elements for performing cleaning processes, such a construction is labor-intensive with regard to handling.

SUMMARY OF THE INVENTION

It is an object of the present invention to configure a device of the aforementioned kind such that a simplified handling is provided.

In accordance with the present invention, this is achieved in that the separating elements have different diameters parallel to the partition.

Because of the different diameters of the separating elements in a transition area from a first separating element into a second separating element, a stepped transition is provided that can be utilized for providing a securing function as well as a sealing function. The use of tie rods is no longer necessary.

A configuration that is beneficial with respect to flow is provided when the separating elements are substantially of a cylindrical shape.

An easy accessibility of the lower separating element in the vertical direction is enhanced when the second (upper) separating element arranged in the area of the upper separating chamber has a greater outer diameter than the first separating element arranged in the area of the lower separating chamber.

For ensuring a functional sealing action, it is proposed to arranged a seal within a transition area from the first separating element into the second separating element.

Handling by employing a lifting device is facilitated when at least one of the separating elements is provided with a handle.

Fixation of the separating elements within the separating container is facilitated when in the area of the partition a cutout is arranged for receiving the first separating element.

Also, a functional securing action of the separating elements within the separating containers is provided when at least one of the separating elements is fastened or secured relative to the partition.

A typical field of application is the use of the separating container for separating or removing a liquid impurity.

Moreover, it is also conceivable that the separating container is used for separating or removing a solid impurity.

A preferred application resides in that the separating container is configured for separating or removing oil from water.

DESCRIPTION OF THE PREFERRED EMBODIMENTS

Figure 1:
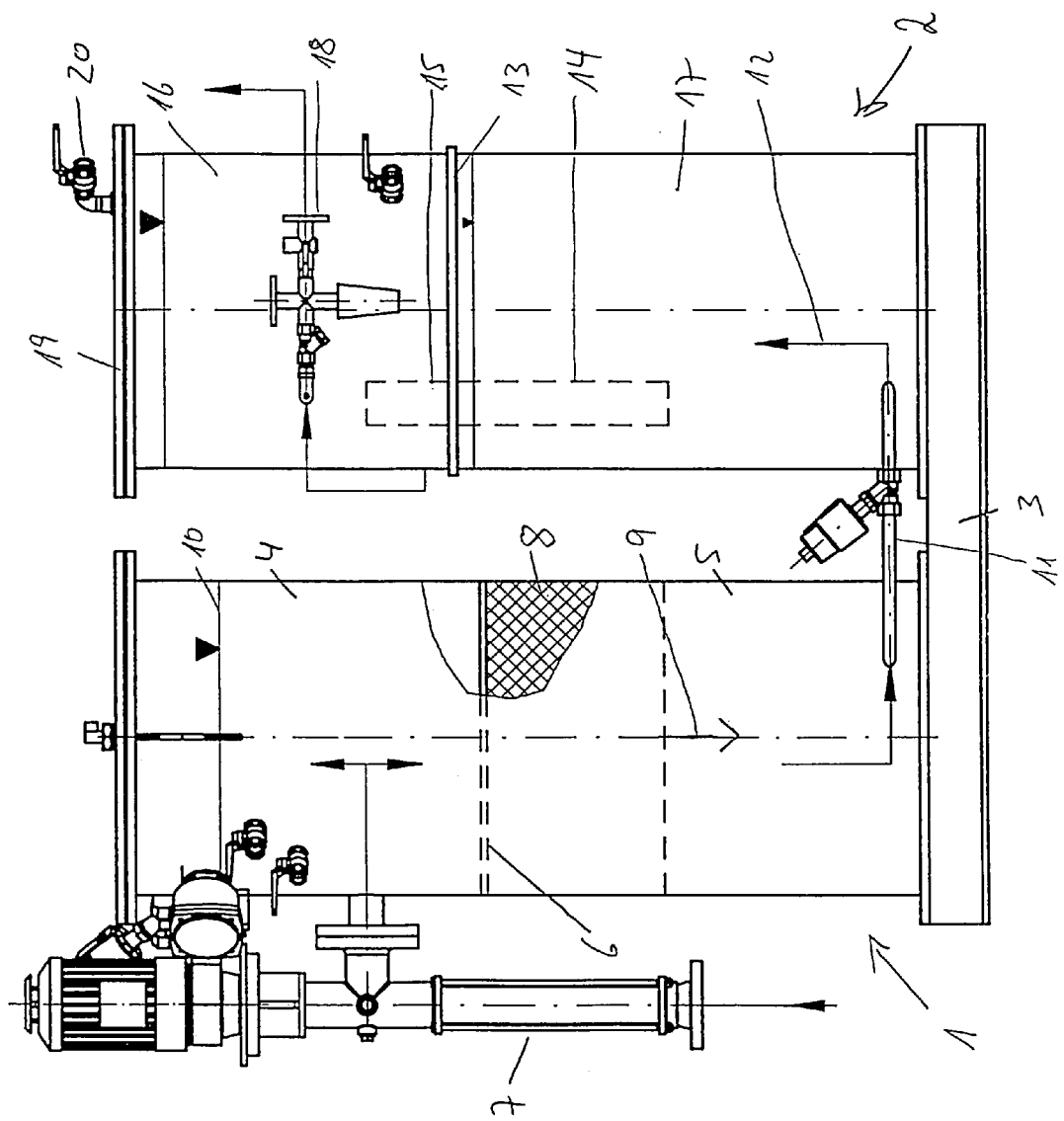
FIG. 1 is a schematic side view of a two-stage separating device.

FIG. 1 shows schematically and partially in section a side view of the device for separating impurities from liquids, in particular for removing oil from water. The device has a first separating stage 1 as well as a second separating stage 2. The separating stages 1, 2 are secured to a common base 3. The first separating stage 1 has an upper separating chamber 4 as well as a lower separating chamber 5; the chambers 4, 5 are delimited relative to one another by a mesh-like partition 6. An inlet 7 opens into the upper separating chamber 4. Below the partition 6 a separator 8 is arranged in the lower separating chamber 5. It is typically composed of a foamed or porous material. The main flow direction 9 in the first separating stage 1 is vertical from top to bottom.

Oil that has a lower density than the residual liquid collects as a result of gravity in the area of the liquid surface 10 in the upper separating chamber 4 of the first separating stage 1. The liquid flowing out of the first separating stage 1 is supplied by a connecting line 11 to the second separating stage 2. In the second separating stage 2, the main flow direction 12 is vertical from bottom to top. The second separating stage 2 is divided by a partition 13 that extends essentially horizontally. In the area of the partition 13 a first separating element 14 and a second separating element 15 are secured. By means of the partition 13, the second separating stage 2 is divided into an upper separating chamber 16 and a lower separating chamber 17. An outlet 18 for the cleaned liquid is connected to the upper separating chamber 16. A discharge for separated oil is arranged in the area of the lid or cover 19 of the second separating stage 2.

Figure 2:
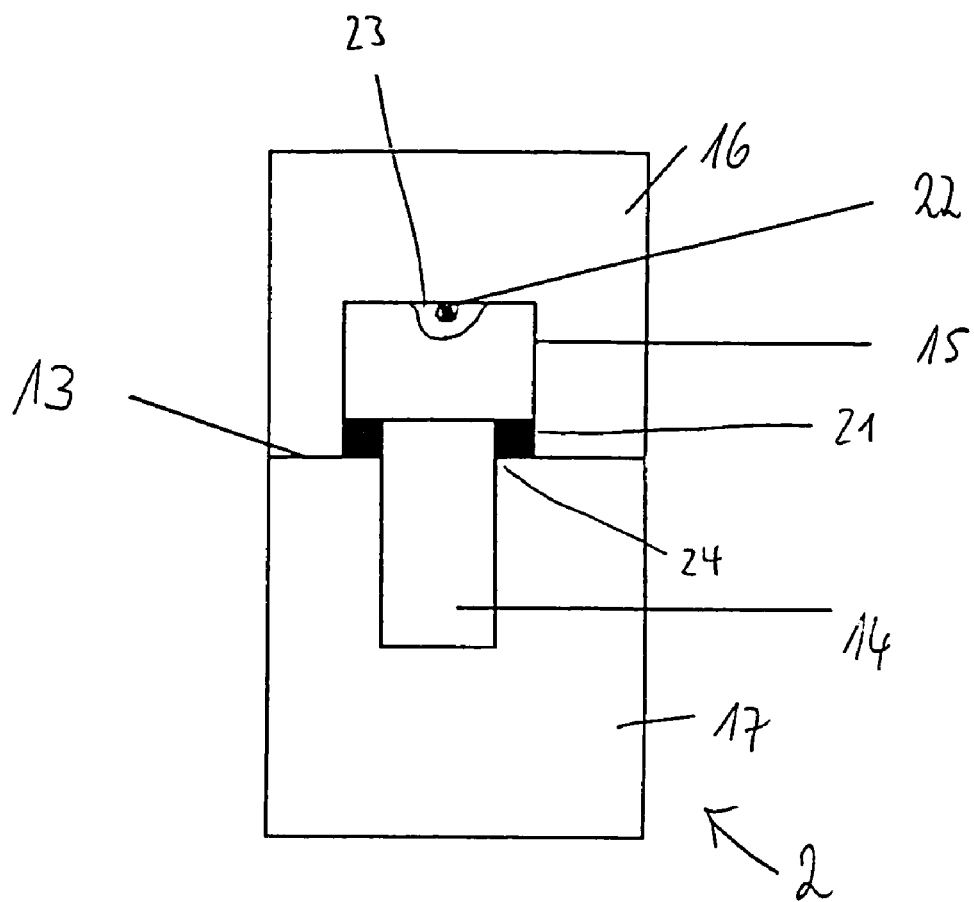
FIG. 2 is a schematic illustration of two separating elements that have different outer diameters and are positioned in the area of a partition.

FIG. 2 shows a schematic illustration of the second separating stage 2 with the two separating elements 14, 15. It is illustrated that the upper separating element 15 has a greater outer diameter than the lower separating element 14. The lower separating element 14 projects with one end through the partition 13 such that a seal 21 can be positioned externally on the separating element 14. The upper separating element 15 is placed onto the lower separating element 14 and the seal 21. Subsequently, the upper separating element 15 is clamped relative to the partition 13 and relative to the lower separating element 14 in order to provide the required sealing action.

Preferably, the separating elements 14, 15 have a substantially cylindrical configuration. For facilitating handling, at least the upper separating element 15 is provided with a handle 22 that is positioned within a recess 23.

For cleaning the separating elements 14, 15, first the lid 19 is removed from the second separating stage 2. Subsequently, the connecting elements that clamp the second separating element 15 and the partition 13 relative to one another are released and the second separating element 15 is pulled out of the upper separating chamber 16. Subsequently, the first separating element 14, optionally by also using a handle, can be pulled out of the lower separating chamber 17 as well as the upper separating chamber 16 through the cutout 24 in the partition 13 so that it can be cleaned. The device is reassembled in reverse sequence.

While specific embodiments of the invention have been shown and described in detail to illustrate the inventive principles, it will be understood that the invention may be embodied otherwise without departing from such principles.

What is claimed is:

1. A device for separating impurities from liquids, the device comprising:

at least one separating container for separating impurities from a liquid/impurities mixture flowing in a flow direction through the at least one separating container;

a partition dividing an interior of the at least one separating container;

at least two essentially cylindrical separating elements arranged sequentially in the flow direction within the separating container, wherein the at least two separating elements have different diameters parallel to the partition, respectively, wherein the partition divides the interior into an upper separating chamber and a lower separating chamber, wherein a first of the at least two separating elements that is arranged in the upper separating chamber has an outer diameter that is greater than an outer diameter of the second of the at least two separating elements arranged within the lower separating chamber, wherein the partition supports the separating elements such that the first separating element is arranged in the lower separating chamber and the second separating element is arranged in the upper separating chamber, further comprising a seal arranged in a transition area from the first separating element to the second separating element, and wherein the second separating element arranged in an area of the upper separating chamber and the second separating element arranged in an area of the upper separating chamber has an outer diameter which is greater than the outer diameter of the first separating element arranged in an area of the lower separating chamber and wherein the flow direction of the liquid containing the impurities is from the lower separating chamber, then through both the second and first separating elements and up into the upper separating chamber.

2. The device according to claim 1, wherein at least one of the at least two separating elements has a handle.

3. The device according to claim 1, wherein the partition has a cutout for receiving a first one of the at least two separating elements.

4. The device according to claim 1, wherein at least one of the at least two separating elements is secured relative to the partition.

5. The device according to claim 1, wherein the at least one separating container is configured to separate a liquid impurity from the liquid/impurities mixture.

6. The device according to claim 1, wherein the at least one separating container is configured to separate a solid impurity from the liquid/impurities mixture.

7. The device according to claim 1, wherein the at least one separating container is configured to separate oil from water.

* * * * *